United States Patent [19]

Ryba

[11] 4,081,066
[45] Mar. 28, 1978

[54] AUTOMATICALLY ACTUATABLE FAN CLUTCH, IN PARTICULAR FOR COOLING SYSTEMS FOR INTERNAL COMBUSTION ENGINES

[75] Inventor: Anton Ryba, Bozen, Italy

[73] Assignee: AUVE Patentverwertungsgesellschaft mit beschrankter Haftung, Munich, Germany

[21] Appl. No.: 710,390

[22] Filed: Aug. 2, 1976

[30] Foreign Application Priority Data

Oct. 22, 1975 Austria .................................. 8038/75

[51] Int. Cl.² .................... F16D 25/04; F16D 43/25
[52] U.S. Cl. .......................... 192/82 T; 123/41.12; 123/41.16; 192/88 A
[58] Field of Search .......................... 192/88 A, 82 T; 123/41.12, 41.16

[56] References Cited

U.S. PATENT DOCUMENTS

| Re. 24,157 | 5/1956 | Johnson | 192/82 T |
|---|---|---|---|
| 1,233,518 | 7/1917 | Snyder | 192/82 T |
| 2,005,468 | 6/1935 | Modine | 192/82 T |
| 2,734,493 | 2/1956 | Findley | 123/41.12 |
| 3,075,691 | 1/1963 | Kelley | 192/82 T |
| 3,311,205 | 3/1967 | Suppes et al. | 192/88 A |
| 3,483,855 | 12/1969 | Thoma | 192/82 T |
| 3,505,982 | 4/1970 | Walter et al. | 192/82 T |
| 3,527,329 | 9/1970 | Jordan | 192/88 A |

*Primary Examiner*—Allan D. Herrmann
*Attorney, Agent, or Firm*—Blanchard, Flynn, Thiel, Boutell & Tanis

[57] ABSTRACT

A fan for a cooling system in an internal combustion engine. The fan has a friction clutch therein which is engageable in response to a predetermined elevated temperature of air passing over a thermostat. The thermostat rotates with the fan. The thermostat is composed of an annular container filled with a liquid having a boiling point which is approximately in the temperature range at which the fan is to become engaged. One wall of the container is movable and forms a part of the friction clutch. The pressure of the liquid in the container is insufficient to effect an engagement of the friction clutch. However, when the temperature is elevated to a point whereat the liquid begins to boil, a gas pressure develops in the container and the gas pressure is sufficient to move the wall of the container to effect an engagement of the friction clutch and, as a result, a driving of the fan.

10 Claims, 4 Drawing Figures

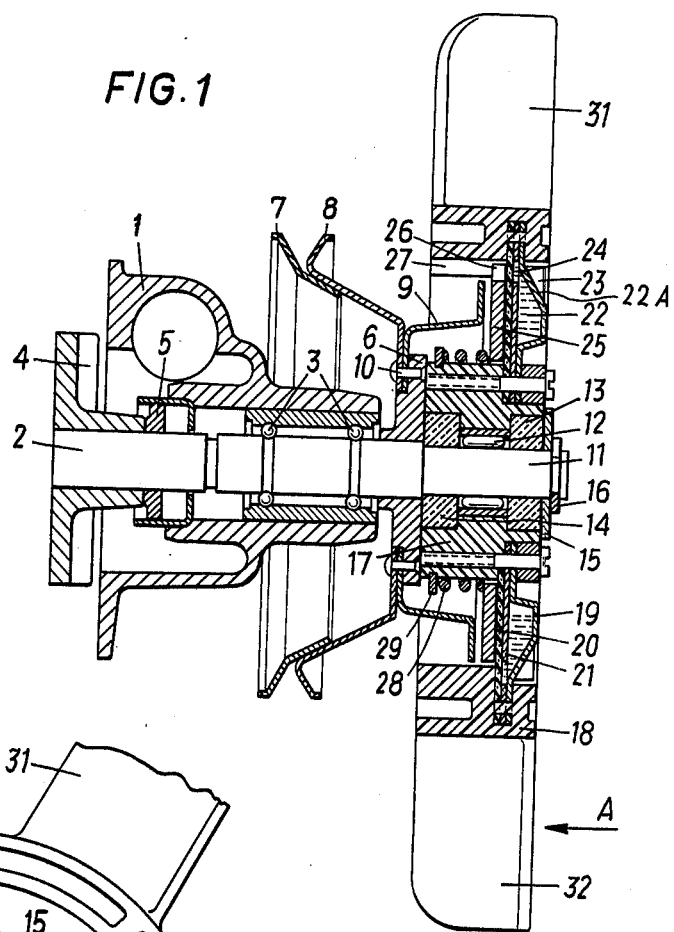
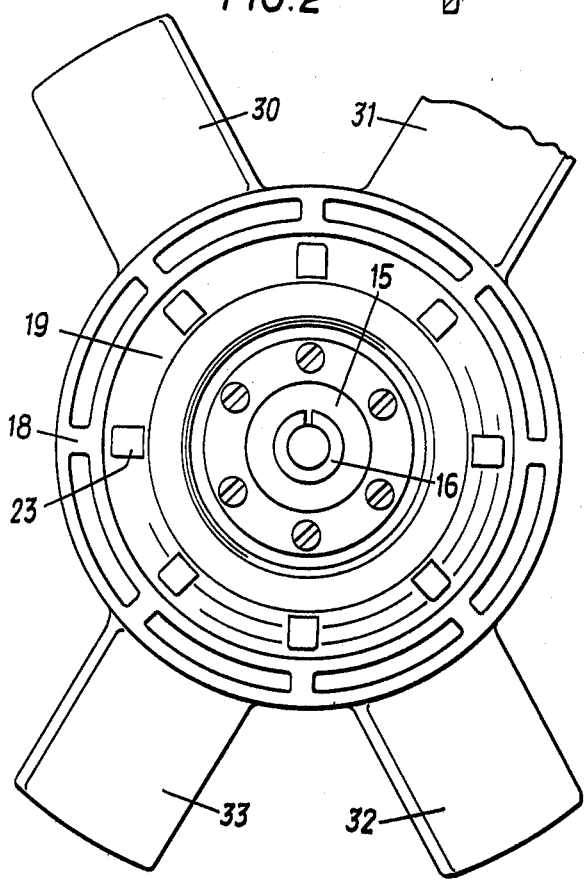
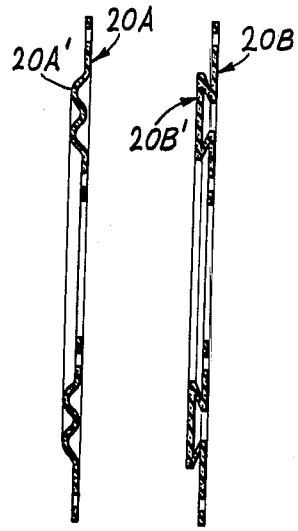

AUTOMATICALLY ACTUATABLE FAN CLUTCH, IN PARTICULAR FOR COOLING SYSTEMS FOR INTERNAL COMBUSTION ENGINES

FIELD OF THE INVENTION

This invention relates to a fan drive arrangement in a cooling system for an internal combustion engine and, more particularly, relates to a thermostatically controlled friction clutch which becomes engaged upon the temperature being elevated above a predetermined level.

BACKGROUND OF THE INVENTION

In vehicles having internal combustion engines, fans must be arranged in the cooling system in order to achieve the necessary heat discharge under all driving conditions, wherein, however, only approximately 15 to 20% of the working range is needed for a forced movement of air by a fan.

If the fan is rigidly connected to the motor and if one considers that the power input for the fan is proportional approximately to the third exponent of the rotational speed, power losses are obtained which lie in the order of magnitude of approximately 8% of the motor power. Furthermore, it is disadvantageous to rigidly connect the motor to the fans because they deliver at high rotational speeds an amount of air which is too great, which leads to overcooling of the motor and furthermore produces unnecessary and very disturbing noises.

In order to avoid the aforementioned disadvantages, suggestions have long been made to provide a shiftable friction clutch or fluid slip clutch connection between the fan and the motor. In addition, it has already been suggested to drive the fan by means of a separate electric motor and to use fans having adjustable blades. All of these suggestions and constructions satisfy the basic requirements only partly or not at all because they have technical, operational and price disadvantages.

Conventional electromagnetically operated fan clutches are generally expensive, are difficult to switch and considerably load the drive elements. Also the current supply through slip rings is not always reliable, without slip rings, however, only acceptable price-wise in special cases. Fans having a separate electric motor can have only very small power outputs because of the relatively small size of the electric unit in the vehicle, which results in an expensive cooler construction and, in addition, also requires still separate switching apparatus and thermostats. Liquid slip clutches have become known in thermostatically controlled and uncontrolled constructions, but the thermostatically controlled construction is too expensive for general use and the uncontrolled construction meets the practical requirements only poorly or not at all; however, due to the constantly occurring slip, amounts of heat must be discharged which result in relatively high work temperatures, so that the use of fans made of normal thermoplastic plastics is not possible without expensive structural measures and this is very disadvantageous for both constructions. Mechanical friction clutches, which have also become known, are unreliable and unsatisfactory in operative behavior due to the structure which is too sensitive for the intended purpose and are difficult to control, so that their practical use could not be successful.

The basic purpose of the invention is to produce a fan for the mentioned purpose which does not have the discussed disadvantages, results in a flow-controlled cooling air stream and is particularly inexpensive and simple in construction and manufacture. This purpose is attained, according to the invention, by arranging on the fan a co-rotating thermostat which is swept over by the moving cooling air and which is constructed as a gas-tight disk- or a ring-shaped container having a solid metallic and an axially flexible wall and contains a liquid or a mixture of liquids, the boiling point of which is approximately in the temperature range at which the fan is to be switched on and by the flexible wall acting onto a friction clutch, in the sense of coupling the fan to a drive shaft as soon as a gas pressure occurs inside of the container due to the liquid having reached the boiling temperature.

It is preferably provided that the liquid or mixture of liquids is contained in such an amount in the thermostat, that a part thereof remains still in liquid form even at the highest occurring cooling temperature and is rotated with the thermostat so that this liquid is moved through the centrifugal force to the outer periphery of the container and applies an additional axially acting pressure onto the flexible wall.

A preferred additional characteristic of the invention is to be seen also in the annular thermostat illustrating the mechanical connection between an inner part connected to the bearing and an outer part of the fan carrying the blades.

BRIEF DESCRIPTION OF THE DRAWING

Exemplary embodiments of the invention are discussed more in detail hereinafter in connection with the drawing, in which:

FIG. 1 is an axial cross section of an inventive fan, which is mounted on the water pump shaft of a vehicle motor;

FIG. 2 is a front view of the fan part, which is swept by the cooling air, and of the thermostat, looking in the direction of the arrow A in FIG. 1; and FIGS. 3 and 4 illustrate diaphragms having two different profiles.

DETAILED DESCRIPTION

Reference numeral 1 in the drawing illustrates the housing of a water pump which is connected to the motor in a conventional manner. The water pump shaft 2 is rotatably supported in the housing 1 by means of a ball bearing assembly 3. In addition, the pump impeller 4 is press fitted onto the water pump shaft 2. A shaft seal 5 separates the water chamber of the motor from the bearing part. A hub 6 is also press fitted onto the water pump shaft 2 and has a V-belt pulley secured thereto which consists of two parts 7,8. A disk 9 is made part of the coupling by securement to the part 8 by means of rivets 10. A fan is freely rotatably supported on the shouldered part 11 of the pump shaft 2. The fan consists of an inner hub part 17 which is rotatably supported directly on the part 11 of the pump shaft 2. This support can be done in various ways, for example in form of a self-lubricating friction bearing, as ball bearing (both types are here not illustrated), or, as shown in FIG. 1, as needle bearing 12 position between self-lubricating friction bearing parts 13 and 14. A disk 15 and a spring ring 16 secure the fan against relative axial shifting on the shaft 2. The fan has an annular outer part 18 having blades 30 and 33 thereon. These parts are manufactured preferably of thermoplastic plastic and are connected to a thermostat 19,20. In the illustrated exemplary embodiment, the outer fan part 18 is molded to the thermostat and the inner ventilator part 17, which can be made of any desired material, is connected to the thermostat by 5 screws.

The thermostat consists of a metal plate 19 which is arranged on the front thereof and is exposed to the cooling air stream, a rubber-elastic disphragm 20 and a preferably metallic clamping washer 21. The metal plate 19 is profiled in such a manner that an annular container or a cavity 22 exists between it and the disphragm 20. The metal plate 19 also has bulges 22 distributed over the front periphery and are used to stiffen the plate 19 and to initiate a rotation of the liquid which is contained in the cavity of the thermostat more quickly. The cavity 22 has a wall surface 22A thereon which guides the liquid to the outer periphery thereof in response to a rotation thereof. The metal plate 19 which is subjected to the cooling air stream may be a stamping from a sheet of metal or it also may be manufactured in a metal casting process wherein the recesses 23 can be replaced, both on the outside and also on the inside by any desired number of radial ribs in the wall surface 22A.

The cavity 22 of the thermostat 19,20 is of a sealed, gas-tight construction. The clamping washer 21 is not absolutely necessary; however, it is preferable because it substantially improves the heat exchange to the fill medium and protects the diaphragm 20 against too great a deformation. The clamping washer 21 has at least one opening 24 at the outer periphery, so that the fill medium can communicate in the spaces in front of and behind the clamping washer 21. The wall surface 22A will facilitate the supply of liquid to the opening 24. The diaphragm 20 can be constructed of a rubber-elastic material with or without fabric inserts or of plastic having suitable elasticity and in the case of relatively large diameters and very small strokes, also of metal. FIG. 3 illustrates an annular diaphragm 20A having a ribbed profile 20A and FIG. 4 illustrates an annular diaphragm 20B with a collapsible pocket 20B'. The number of ribs 20B' or collapsible pockets can, of course, be chosen as desired.

A friction disk 25 is also arranged between the diaphragm 20 and the disk or plate 9 and is positioned freely axially movably on the hub 17 and consists of a material which is suited for friction clutches. The friction disk 25 has several radial projections 26 on the periphery which engage suitable axially extending grooves or internal splines 27 on the outer fan part 18. One end of a prestressed helical spring 28 presses on one side of the friction disk 25 and is supported at the other end on the spring ring 29 secured to the hub part 17. The spring 28 can also be constructed as a cup spring.

FIG. 2 illustrates a fragment of the blades 30, 31, 32 and 33 which are positioned on the fan part 18.

A liquid is in the cavity 22 of the thermostats 19,20, which liquid has a boiling point which is approximately within the temperature range of 50° to 60° C. If the boiling point is lower, this can, if desired, be compensated for by the initial stress of the spring 28. The amount of fill is chosen such that over the entire work field, thus also at high temperatures, a certain amount of the liquid always remains nonevaporated in the thermostat, and thus is carried along into rotation by the fan. This remaining amount of liquid is to be measured such that the portion of the contact force between the friction disk 25 and disk 9 which is produced through its centrifugal forces and acts axially onto the clutch part, is alone not sufficient to transmit the clutch torque without a temperature-caused gas pressure.

One can use a fill medium, for example, trichlorotrifluoroethylene $(C_2Cl_3F_3)$ which is known under the Trademark "Freon 113." It is understood that when diaphragms of plastic are used, a plastic is chosen which is chemically durable. If "Freon 113" is used as the fill medium, it is possible to use for a rubber-elastic diaphragm, for example, an elastomer caoutchouc which is known under the Trademarks Cloropren, Vitan and Neopren. Of course, other material combinations are also possible. The fill medium can, for example, also consist of two or more different liquids, wherein, however, the boiling point of none of the materials is substantially below the desired switching-on temperature of the thermostat.

OPERATION

The operation is as follows:

When the described fan is arranged behind a vehicle cooler or radiator and is driven through the V-belt pulley 7,8 from the motor, at the start of the operation the valve impeller 17,18 is at first not coupled with the shaft 11 and stands almost still. The air which flows through the cooler and is warmed up will slowly act onto the thermostat of the fan; such an air flow is created already at a low travelling speed, yet already caused by a windmilling of the fan. At an increasing temperature of the cooling air flow, the thermostat is also moved to higher temperatures and when the associated temperature is reached, the fill medium starts to boil in the thermostat, wherein, upon further constant heat supply in the thermostat, a gas pressure is built up which presses the elastic diaphragm 20 leftwardly (FIG. 1) and by overcoming the force of the spring 28, the friction disk 25 is pressed against the disk 9 which is driven by the motor. Due to the starting frictional connection, the fan and the thermostat parts 20 to 24 which are connected to the fan starts also to rotate accordingly through the projections 26. The liquid which exists in the thermostat also starts to rotate and the centrifugal force forces the liquid to the outer periphery and applies an additional pressure onto the axially flexible diaphragm and is also transmitted onto the friction disk 25 and reinforces the contact force which is caused by the gas pressure to effect a substantial increase in the torque which can be transmitted. Through the cooperation of gas and liquid pressure, the clutch is engaged so softly that the drive elements of the fan do not need to absorb any intermittent surge in the load.

As long as the cooling air temperature is above the normal value, the engaged condition of the clutch will be maintained and an intensive cooling of the radiator occurs. If the cooling air temperature drops to a value which is near the boiling temperature of the fill medium, then the gas pressure which acted in the thermostat disappears also and only the amount of pressure produced by the centrifugal force remains, which, however, is alone not sufficient, to transmit the fan torque in all working ranges. If in any working condition the clutch disengages only for a moment, then immediately the fan speed drops and the amounts of pressure produced by the centrifugal force breaks down quickly because this force is proportional to the square of the speed of rotation. To this must be added that at the moment when the clutch starts to slip, the dynamic frictional value is decisive at the friction disk 25, which value, however, is substantially smaller than the static frictional value (friction of engagement). With this a quick, practically slip-free disengagement of the friction clutch is assured.

The design construction of the inventive fan and also the chosen temperatures, fill medium and materials, etc. can be changed, without moving away from the sense of the invention.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an automatically actuatable fan clutch, in particular for cooling systems of internal combustion engines, the improvement comprising a thermostat secured to said fan and rotatable therewith, said thermostat being positioned so that it is swept over by the moving cooling air, said thermostat comprising a gas-tight annular container having a solid metallic wall and an axially flexible wall, said annular container having a liquid therein, the boiling point of which is approximately in the temperature range at which said fan clutch is supposed to be engaged, means for guiding said liquid to the radially outer periphery in response to a rotation of said annular container, said flexible wall expanding into engagement with a friction clutch member in said fan clutch to couple the fan to a drive shaft in response to a gas pressure occurring inside of said container due to said liquid having reached the boiling temperature, said liquid being contained in such amounts in said container that a part therof remains still liquid even in the case of the highest occurring cooling air temperature and is rotated with said container so that this liquid is moved by centrifugal force to said outer periphery of said container to effect the application of an additional axially acting pressure onto said flexible wall and resilient means normally urging said friction clutch member out of clutch engaging relation, the force of said resilient means being greater than the amount of force generated by said non-boiling liquid on said flexible wall during rotation of said annular container and less than the force generated by said gas from said boiling liquid.

2. The improved fan according to claim 1, wherein the thermostat provides the mechanical connection between an inner part of the fan which carries the bearing and an outer part of the fan which carries the blades.

3. The improved fan according to claim 1, wherein the axially flexible wall of the thermostat consists of a rubber-elastic material.

4. The improved fan according to claim 1, wherein the axially flexible wall has concentrically annular ribs.

5. The improved fan according to claim 1, wherein the axially flexible wall has an annular folding pocket.

6. The improved fan according to claim 1, wherein the thermostat is molded to the part of the fan made of thermoplastic plastic and carrying the blades.

7. The improved fan according to claim 1, wherein said thermostat is mechanically fixedly connected to at least one of the two fan parts by means of screws or rivets.

8. The improved fan according to claim 1, said annular container has a fixed metallic wall exposed to the cooling air stream, wherein between said fixed metallic wall and said axially flexible wall of the thermostat there is arranged a metallic partition which has adjacent said outer periphery at least one opening through which the spaces on both sides of this partition can communicate with one another.

9. The improved fan according to claim 1, including a needle bearing and self-lubricating friction bearing parts arranged inside of the fan hub.

10. The improved fan according to claim 1, wherein the liquid in said thermostat contains liquidy trichlorotrifluoroethylene ($C_2Cl_3F_3$).

* * * * *